Aug. 20, 1929.  G. T. MARKEY ET AL  1,724,949
GRAIN GERMINATOR OR HYDROSOAKER
Filed Nov. 7, 1927  2 Sheets-Sheet 1
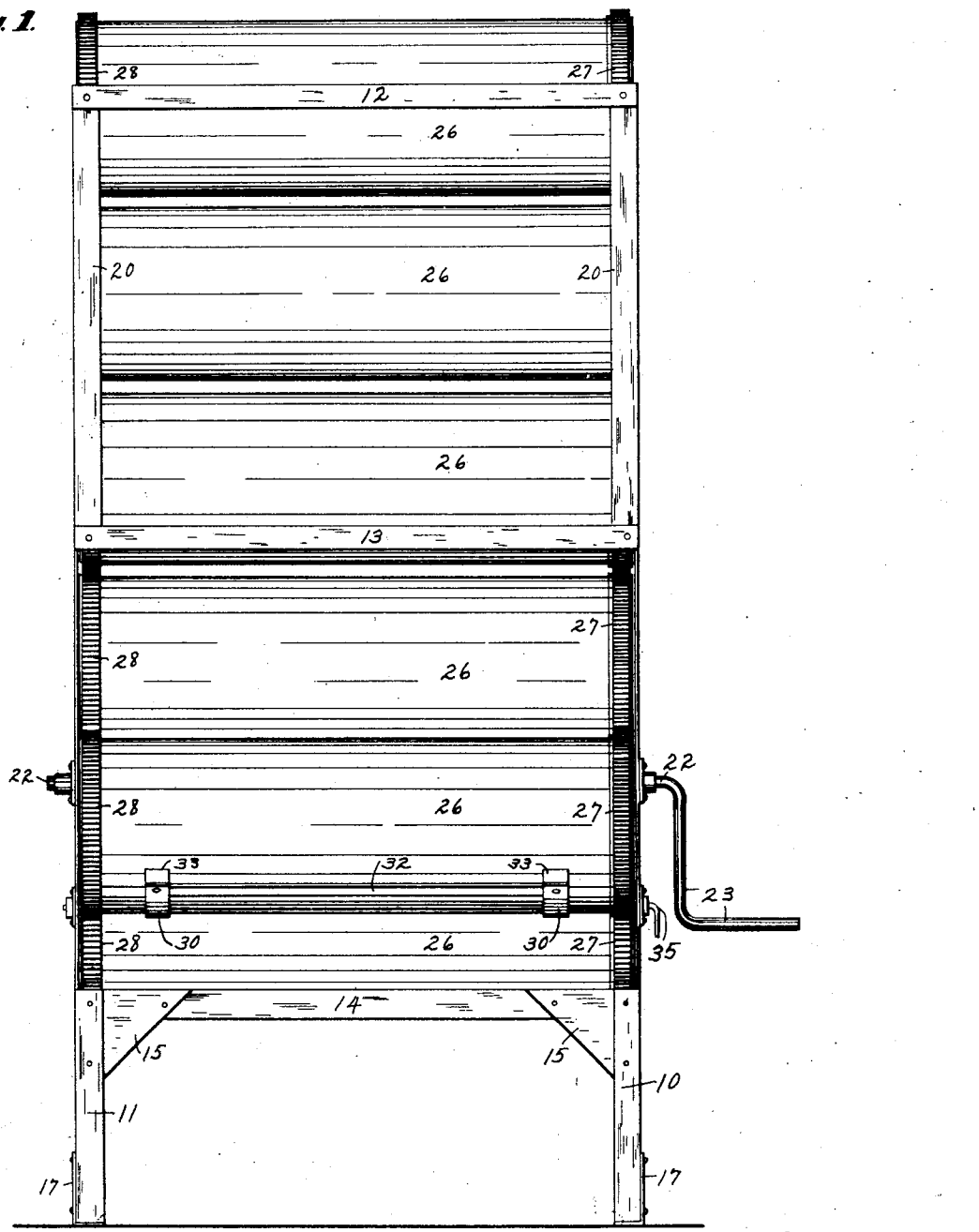

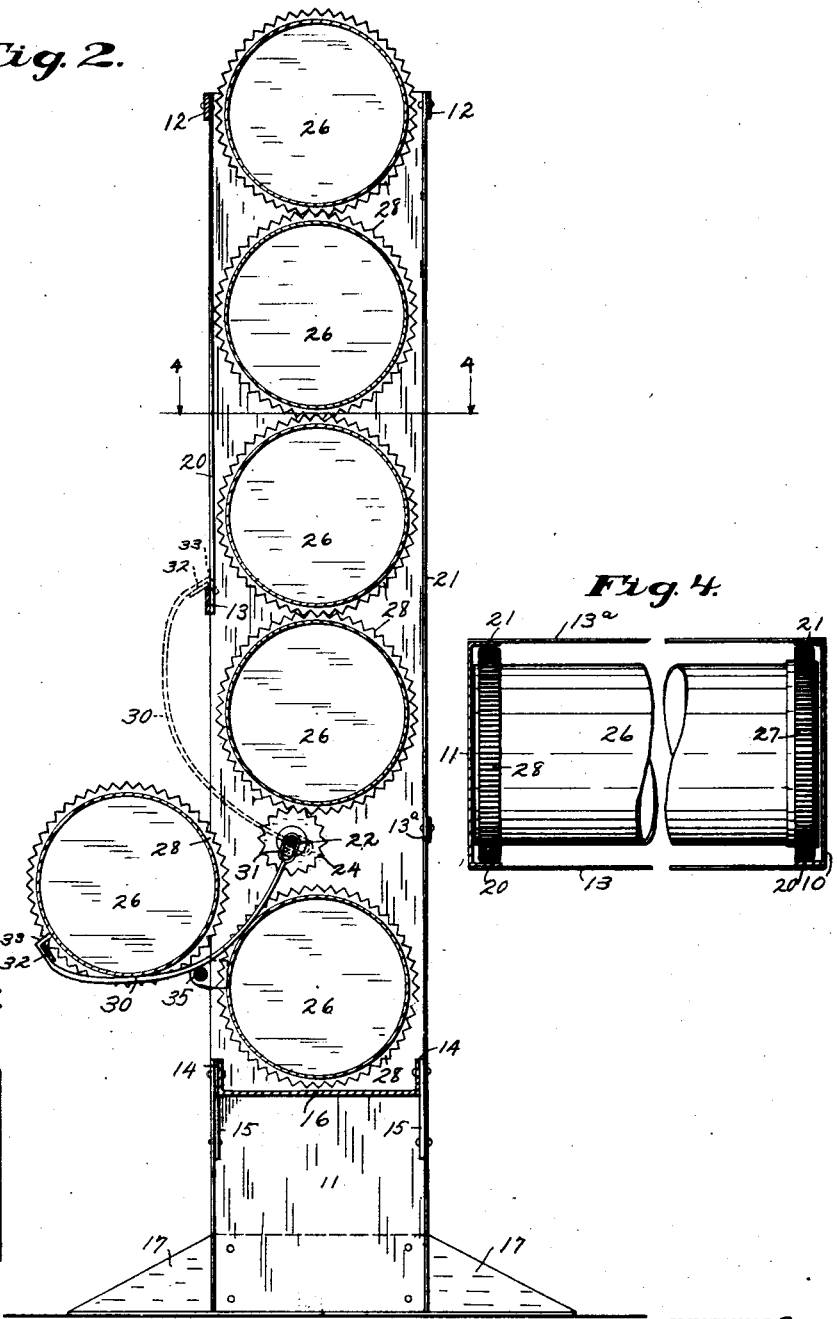

Patented Aug. 20, 1929.

1,724,949

UNITED STATES PATENT OFFICE.

GEORGE T. MARKEY AND JOHN B. OLSON, OF FORT ATKINSON, WISCONSIN, ASSIGNORS TO JAMES MANUFACTURING COMPANY, OF FORT ATKINSON, WISCONSIN.

GRAIN GERMINATOR OR HYDROSOAKER.

Application filed November 7, 1927. Serial No. 231,531.

This invention relates to improvements in grain germinators, or hydro-soakers.

The object of this invention is to provide means to facilitate the germination of grains in batches or predetermined quantities to be successively delivered in condition for use at uniform intervals.

More particularly stated, it is the object of this invention to provide means for feeding a series of grain containers toward a point of delivery in such a manner that the removal of one container from the feeding apparatus at the point of delivery will automatically cause a rotative adjustment of all of the other containers in the series of such character as to maintain a nearly homogeneous distribution of moisture throughout the grain within the containers notwithstanding the tendency of the moisture to settle by gravity when the containers are at rest. Further objects are to provide means whereby the containers may be successively emptied, refilled and again passed through the feeder with no danger of confusion as between containers freshly filled with grain and those in which the grain has sprouted sufficiently to be removed; to provide means to facilitate the removal of a container from the bottom of a stack or pile and allowing superposed containers to successively descend during each such removal without danger of having any of the containers drop or become displaced; to provide containers having walls adequately protected against injury and the protecting means utilized to effect a rotation of all the containers in a series as often as desired and in any event when one of them is being delivered; and in general, to provide a convenient and sanitary means for handling sprouting grain and delivering predetermined quantities of fully sprouted grain on successive days from a series of containers corresponding in number with the number of days required for germination.

The invention is peculiarly adapted for embodiment in so-called oats germinators comprising containers within which oats are sprouted and then fed to young poultry.

In the drawings:

Figure 1 is a front elevation of a grain germinator embodying my invention.

Figure 2 is an end elevation with the end wall of the feeder removed and also showing one of the containers as it appears immediately after delivery from the bottom of the column in the feeder, and also showing one of the containers in the grain soaking position which it occupies preparatory to insertion in the feeder.

Figure 3 is a fragmentary view showing a capped end portion of a container in longitudinal section.

Figure 4 is a horizontal section drawn generally to lines 4—4 of Figure 2.

Like parts are identified by the same reference characters throughout the several views.

A pair of channel shaped upright standards 10 and 11 are connected to form a frame, the connections comprising front and rear connecting bars 12, intermediate bars 13 and lower bars 14, the latter being suitably braced at 15 and connected by a floor 16. The lower ends of the standards 10 and 11 are preferably provided with flanged foot pieces 17, extended sufficiently to the front and rear to adequately support the frame. At the front side of the frame the standards are provided with inturned flanges, which constitute marginal retainers or guards 20 between the upper frame bar 12 and the intermediate bar 13, and at the rear side similar flanges 21 are provided which may extend from the upper to the lower frame bar, or at least to an intermediate frame bar 13$^a$ connecting the two standards on the rear side.

A crank shaft 22 has end portions journaled in the respective standards and spanning the space between them, one of the ends protruding and provided with a crank 23 whereby the shaft may be manually rotated. This crank shaft is provided with pinions 24 rigidly secured thereto adjacent the inner faces of the respective standards. The shaft extends through the standards substantially midway between their front and rear margins.

A series of cylindrical containers 26 of a length nearly equal to the distance between the standards are provided with gear rings 27 and 28 at their respective ends in positions to mesh with the pinions 24 on the crank shaft. These gears may also mesh with those of like containers and a series of containers 26 are placed in superposed relation between the standards with their ends embraced by the flanges 20 and 21 and with the lowermost container of the series disposed with its gears in mesh with the pinions 24. The crank shaft supports the entire series from the standards in which said shaft is journaled.

A can holder, retainer or swinging guard has curved arms 30 provided with eye-loops 31 at their inner ends which loosely engage the crank shaft. Outer end portions of these arms are connected with each other by a bar 32, and the extremities of the arms are provided with hooks 33 which may be engaged over the horizontal frame bar 13 when the holder is swung upwardly to the position in which it is shown by dotted lines in Figure 2. The arms 30 are formed of resilient material and there may also be sufficient looseness in the connection of the eyes 31 with the crank shaft to allow the hooks 33 to be engaged over the bar 13 in a manner to allow the arms 30 to be used as guards to prevent the lowermost container of the series from accidentally moving outwardly and discharging from the feeder. But by lifting the hooks from the bar 13 and swinging the arms 30 forwardly and downwardly, the container which immediately rests upon the pinions 24 may be fed outwardly by rotating the crank in a counter-clockwise direction. The operator will in the meantime hold the arms 30 in a raised position as the container is fed out against them and then gradually lower them to the position indicated by full lines in Figure 2, whereupon the container will be supported in front of the frame. In the meantime the superposed containers will have been gradually lowered until the gear wheels on the next container in the series are in mesh with the pinions. Thereupon the delivered container may be removed and another container, freshly prepared with soaked oats, may be inserted in the frame at the top.

The holder is preferably provided with sufficient space below the crank shaft to receive an empty container, and if desired this may serve as a support for the arms 30, although an auxiliary rod or shaft 35 may be inserted for that purpose through holes in the standards. When a container is removed, the empty container in the base of the holder may be removed, filled with grain and water and left to soak in an upright position until needed. When needed to fill the holder, it may be first inverted and drained, the cap being preferably sufficiently loose to allow water to drain away without removal of the cap. The gear rings 27 are secured to the flanges of the removable caps as shown in Figure 3.

The crank shaft may be rotated as frequently as desired, without removing the hooks 33 from the frame bar 13, thereby turning each of the filled containers a one-half turn to redistribute the free water and allow it to repeatedly filter downwardly through the grain, not only upon removal of the containers, but also at suitable intermediate periods.

We claim:

1. A grain germinator comprising a holder for superposed containers, a set of grain containers, and means for feeding such containers singly from the lower portion of the holder and lowering the other containers proportionately to the out-feeding movement, with a simultaneous turning movement of inversion whereby the contents of each container may be inverted to effect a redistribution of the liquid contents.

2. The combination with a holder for cylindrical containers, a set of removable, cylindrical containers provided with attached gear wheels and adapted to be received in the holder in superposed intergeared relation to each other, supporting gearing for the lowermost container, and means for actuating the same, said holder being formed with vertical container retaining guides in its upper portion, said guides terminating at a sufficient distance above the supporting gearing to allow an out-feeding movement of one of the containers and a corresponding descending and rotative movement of each of the superposed containers.

3. The combination with a set of cylindrical containers, ring gears secured thereto, a holder, marginal retainers in the upper portions of the holder adapted to support the containers in superposed relation with their gears intermeshing, supporting gears for the gears of the lowermost container in the set, and an actuating shaft for the supporting gears, the holder being open below the retainers to allow the lowermost container of the set to feed outwardly when the supporting gears are rotated.

4. The combination with a set of cylindrical containers, ring gears secured thereto, a holder provided with upright standards, marginal retainers along the upper portions of the standards adapted to embrace the ends of the containers and hold them in superposed relation with their gears intermeshing, supporting gears for the gears of the lowermost container in the set, an actuating shaft for the supporting gears, the holders being open below the retainers to allow the lowermost container of the set to feed outwardly when the supporting gears are rotated, and a set of retaining arms adapted in one position to prevent out-feeding movement of a container and in another position to serve as a receiving shelf for the out-feeding container.

5. The combination with a holder, including a set of channel shaped supports provided with a crank shaft spanning the space between them and provided with gear members adjacent the inner faces of the supports, a set of cylindrical containers provided with ring gears at their respective ends and adapted to fit between the supports with their axes substantially perpendicular thereto and the gear rings in mesh with each other and with the gear members on the shaft, said supports having openings in their channeled walls adjacent the first mentioned gear members to permit an out-feeding movement of a registering container, and an adjustable retainer pivoted to the crank shaft and having a portion engageable with the holder in a position to obstruct such out-feeding movement and adapted, when such portion is disengaged, to swing downwardly to a position for receiving the out-feeding container and controlling its outward movement.

6. The combination with a holder for a set of superposed cylindrical containers with their axes horizontally disposed, of a set of cylindrical containers provided with removable caps and adapted to fit the holder, said holder having a portion adapted to swing downwardly to release the lowermost container of said set, means for feeding said lowermost container outwardly with a rotative movement, and means for transmitting such rotative movement to rotate the other containers in the set.

7. The combination with a holder, of a set of superposed intergeared normally closed containers, and means for applying rotative movement to one of said containers to rotate all of them simultaneously, said holder being open to permit removal of the containers in succession.

8. The combination of a holder for a set of superposed intergeared containers, means for applying rotative movement to one of said containers to rotate all of them simultaneously, and adjustable means for permitting and controlling delivery of the lower container and a corresponding descent of the others.

9. In a hydro-soaker, a series of normally closed cylindrical containers each provided with a fixed ring gear at one end and having a removable cap at the other end also provided with a ring gear.

10. In a hydro-soaker, a holder for cylindrical containers comprising the combination of a set of standards adapted to receive the containers horizontally between them in superposed relation to each other, marginal guards for said standards adapted to retain the upper containers, and a swinging guard for normally retaining the lower container of the superposed set, said swinging guard being pivotally connected with the holder at one end and provided with a hooked member at the other end, and the holder having a member connecting the standards and adapted to be releasably engaged by the hooked member when the guard is in a raised container retaining position.

GEORGE T. MARKEY.
JOHN B. OLSON.